Figure 1:
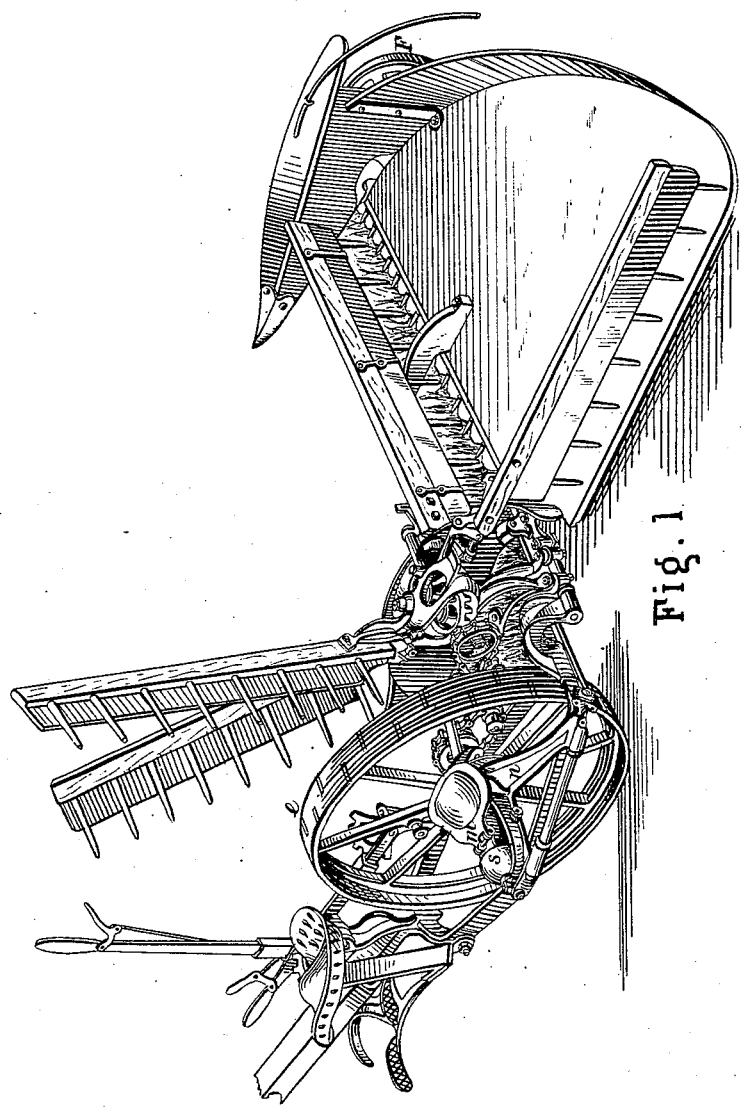

(No Model.)  4 Sheets—Sheet 1.

W. N. WHITELEY.
REAPER AND MOWER.

No. 284,931. Patented Sept. 11, 1883.

Attest
J. C. Turner
R. W. Smith

Inventor
William N. Whiteley,
By his atty
R. D. Smith (No Model.) 4 Sheets—Sheet 2.
W. N. WHITELEY.
REAPER AND MOWER.
No. 284,931. Patented Sept. 11, 1883.
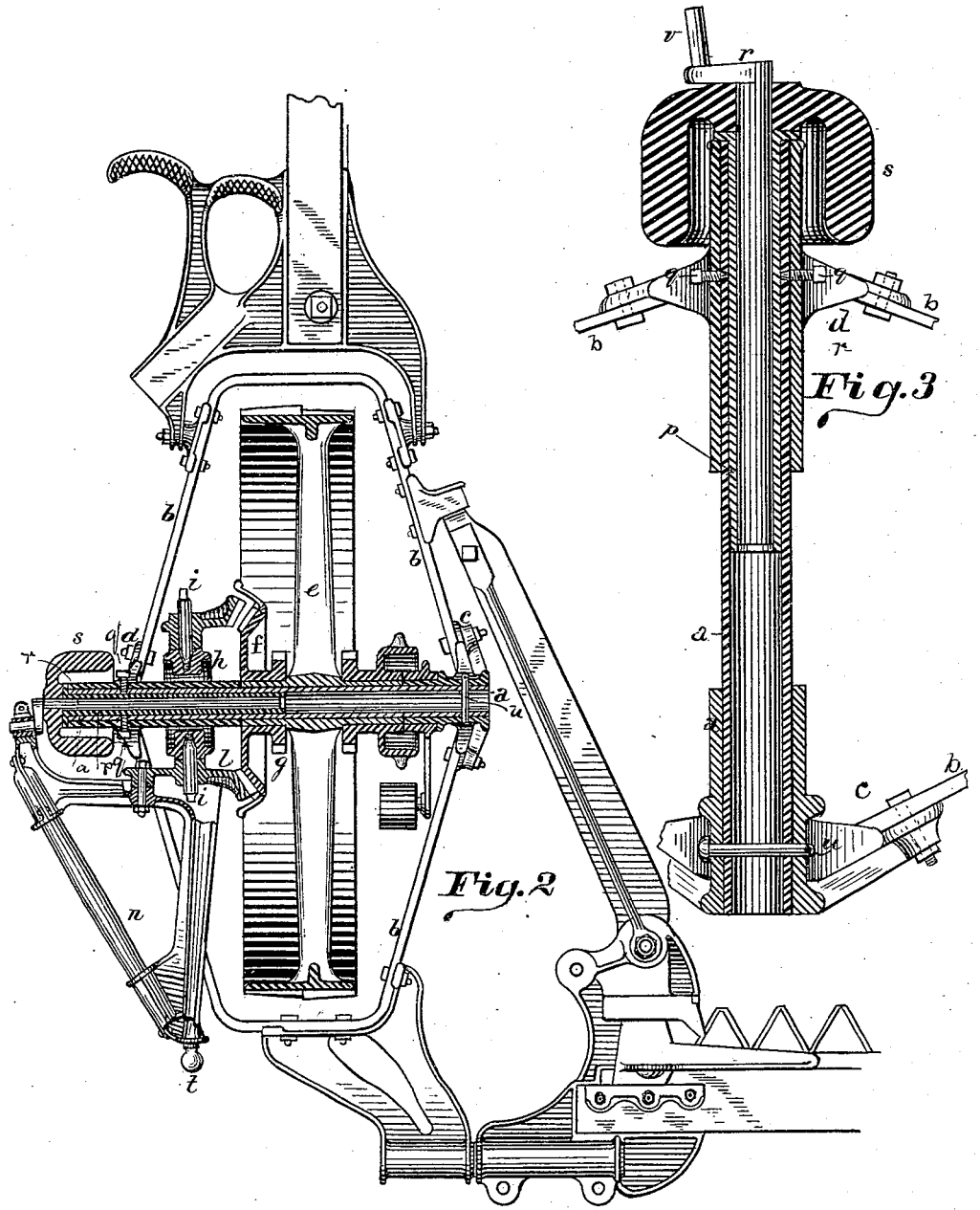

(No Model.)  4 Sheets—Sheet 3.
W. N. WHITELEY.
REAPER AND MOWER.
No. 284,931. Patented Sept. 11, 1883.
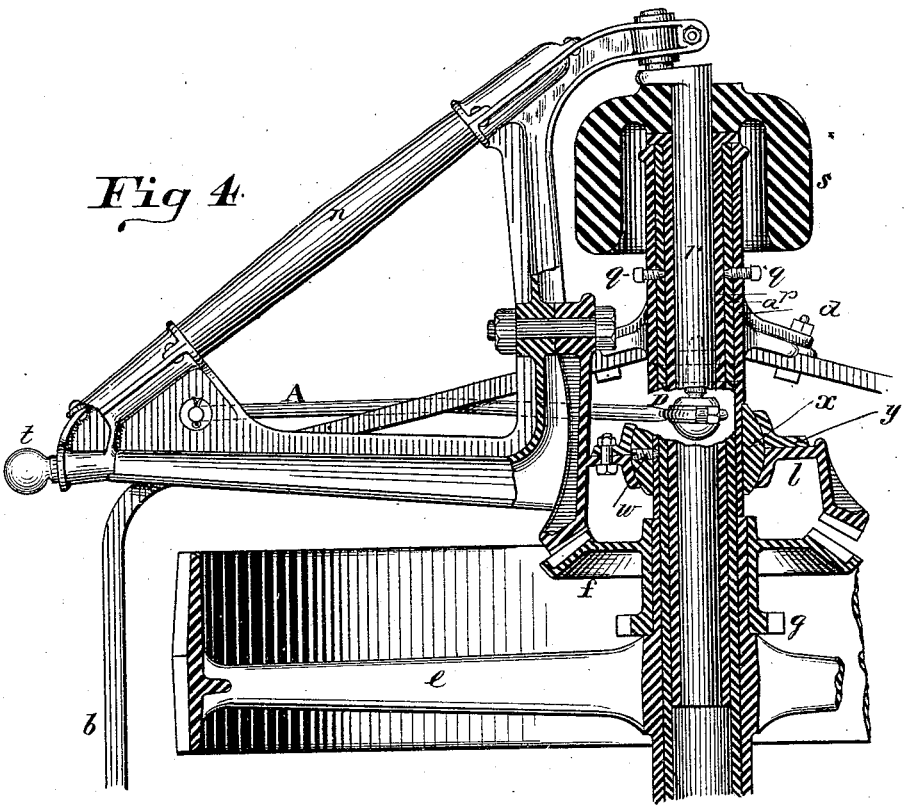
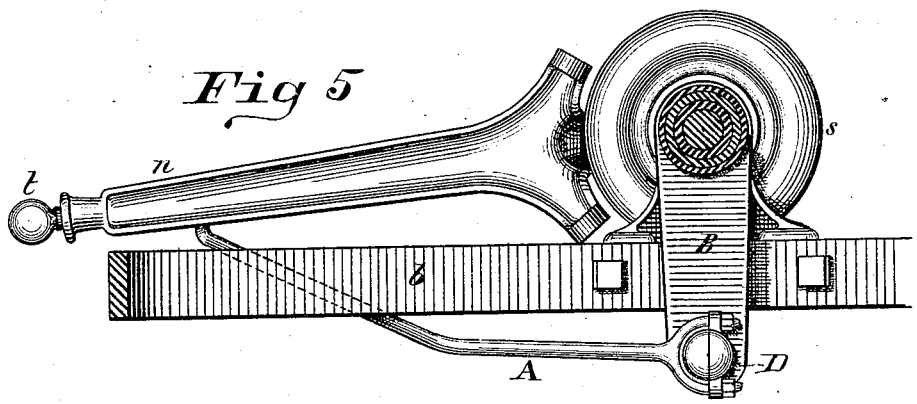
Attest  
J C Turner  
Aug. Jordan
Inventor  
W<sup>m</sup> N Whiteley  
By his atty  
R D O Smith (No Model.)  4 Sheets—Sheet 4.
W. N. WHITELEY.
REAPER AND MOWER.
No. 284,931. Patented Sept. 11, 1883.
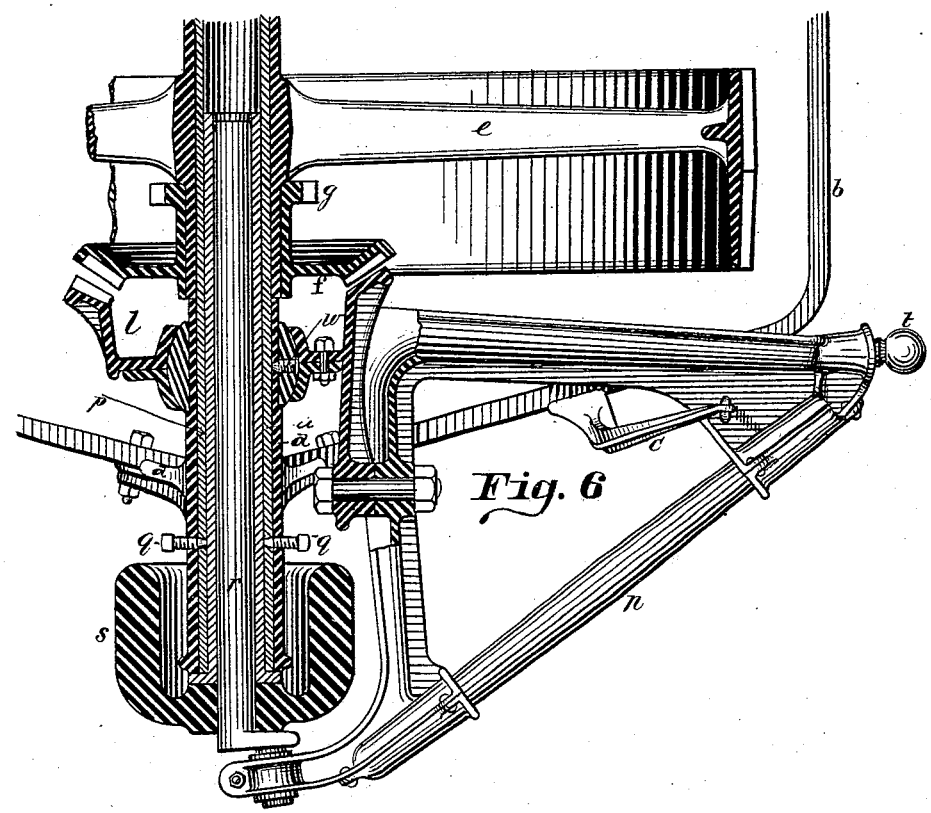
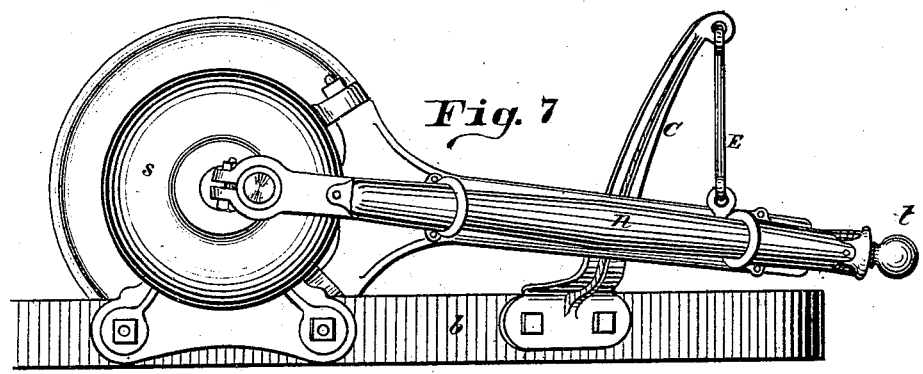
Attest  
J. C. Turner  
Aug. T. Jordan
Inventor  
W. N. Whiteley  
By his att.  
R. A. O'mitts

UNITED STATES PATENT OFFICE.

WILLIAM N. WHITELEY, OF SPRINGFIELD, OHIO, ASSIGNOR TO WHITELEY, FASSLER & KELLY, OF SAME PLACE.

REAPER AND MOWER.

SPECIFICATION forming part of Letters Patent No. 284,931, dated September 11, 1883.

Application filed May 4, 1882. (No model.)

*To all whom it may concern:*

Be it known that I, WILLIAM N. WHITELEY, of Springfield, county of Clarke, State of Ohio, have invented a new and useful Improvement in Reapers and Mowers, of which the following is a specification, reference being had to the accompanying drawings and letters of reference thereon, in which—

Figure 1 is a perspective view of a reaper containing my improvements. Fig. 2 is a sectional plan of a portion of a reaper provided with differential gear-wheels having gimbal-joints to support a vibrating driving-arm and the rolling portion of the differential gear that gives it motion, with my improvements attached thereto. Fig. 3 is an enlarged view illustrative of my improvements. Fig. 4 is a sectional plan of a portion of a machine provided with differential gear for imparting motion to the vibrating drive-arm, in which the rolling part of said gear moves on a ball-and-socket instead of a gimbal joint, and the drive-arm is supported by a pivoted brace-rod; and Fig. 5 is an elevation of the same. Figs. 6 and 7 illustrate a modification in the manner of supporting the vibrating drive-arm.

As the object of this invention is, mainly, to simplify and perfect the machine patented to me November 13, 1877, numbered 197,192, which may be referred to where a full description is desired, I shall confine myself to a description of so much of it as will serve to elucidate the improvements which are the subject of this application.

The shaft *a* is cut from a tube of wrought-iron of suitable dimensions, and it is rigidly attached to the main frame C of the machine by means of boxes *c* and *d*. Between the boxes *c* and *d*, and rotating on shaft *a*, is fitted the master-wheel *e*. The outside of the hub of the master-wheel is turned off at both ends, and on the outer end is fitted the differential gear-wheel *f*. The wheel *f* revolves freely on the hub of wheel *e*, and is driven by means of a ratchet-wheel, *g*, and a pawl attached to the master-wheel. On the box *d* is secured the gimbal-ring *h* by means of the pins *i*, and on this gimbal-ring is secured the differential wheel *l*. The four pins *i* form a universal joint, the intersection of the cross-axis being common with the axis of the shaft *a*, which allows the internal differential gear, *l*, to roll on the wheel *f* and give motion to the vibrating arm *n*, which is firmly secured to the wheel *l*. The shaft *a*, which is one of the features of the present invention, is bored out a distance in this case equal to one-half of its length, and a brass bush, *p*, is inserted to fit the bore thus made. The bush *p* is secured to the shaft *a* by set-screws *q*, and can be readily taken out for repairs, even though it should become cemented in by rust, as the void end of the hollow shaft *a* will furnish a convenient entrance for a drift, by which it can be driven out. It will be observed that the bush *p* forms a long bearing for crank-shaft *r*, and thus makes it more durable, and consequently more uniformly perfect in its movements. On the crank-shaft *r* there is fitted a fly-wheel, *s*, which controls the motion of the wheel *l* and relieves the thrust of the knife at the time of the stroke. The knife-pitman is joined to the vibrating arm *n* by means of a pin, *t*. The shaft *a* is secured to the boxes *c* and *d* by means of set-screws *q*, which pass through the box *d*, and a pin, *u*, which passes clear through the box *c* and shaft *a*, as will be readily understood by reference to Figs. 2 and 3 of drawings.

When the machine is in operation, the master-wheel *e*, through the agency of a pawl pivoted to one of its arms, communicates motion to the ratchet-wheel *g*, formed upon the gear-wheel *f*. The gear-wheel *f* is provided with two more teeth than the gear-wheel *l*, and the gimbal-joint formed upon the shaft *a* by the ring *h* and pins *i* permits the meshing teeth of the wheel *l* to roll away from those of wheel *f*, which will then move forward two teeth. The number of teeth on wheel *l* in excess of those on wheel *f*, and the end of the vibrating arm *n* being attached to the wheel *l* and to the crank *v* of crank-shaft *r*, limits the wheel *l* to a certain rolling motion, which will bring all the teeth on wheel *l* successively in contact with the teeth on wheel *f* and give to the end of arm *n* a vibratory movement suitable for the motion of the knife.

Should a ball-and-socket joint be used instead of a gimbal-joint, the ball may be fastened to the shaft *a* by means of screws *w*, which have their points inserted into the shell of the shaft *a* and their heads flush with the surface of the ball *x*, so as in no way to interfere with the freedom of the shaft *r* or socket *y*, and the end of the vibrating arm *n* may be sustained by either of the two methods shown by Figs. 4 to 7, inclusive. In Figs. 4 and 5 the arm *n* is shown as supported from beneath by means of a pivotal brace-rod, A, bent at one end, so as to enter arm *n* in a suitable manner, and at the other end furnished with a universal joint, D, secured to a depending portion, B, of the main frame *b*. In Figs. 6 and 7 the end *t* of the arm *n* is shown as suspended from an overhanging bracket, C, by a link, E.

Having thus described my invention, what I claim as new, and desire to secure by Letters Patent, is—

In a machine substantially such as herein described, the combination of the following members: a single supporting-wheel, *e*, and main frame surrounding the same, differential gear *l f*, and vibrating arm *n*, located upon the outer side of said frame, and the vibrating support to sustain said arm in proper working position, also located on the outer side of said wheel, substantially as set forth.

In testimony whereof I have hereunto set my hand this 17th day of April, 1882.

WILLIAM N. WHITELEY.

Witnesses:
 HENRY MILLWARD,
 E. BOWMAN.